United States Patent
Fujimoto

(10) Patent No.: US 11,113,134 B2
(45) Date of Patent: Sep. 7, 2021

(54) COMPUTER SYSTEM, COMMUNICATIONS SYSTEM, CONTROL METHOD BY COMPUTER SYSTEM, AND PROGRAM

(71) Applicant: NEC Platforms, Ltd., Kawasaki (JP)

(72) Inventor: Naoki Fujimoto, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 17/041,097

(22) PCT Filed: Mar. 28, 2019

(86) PCT No.: PCT/JP2019/013594
§ 371 (c)(1),
(2) Date: Sep. 24, 2020

(87) PCT Pub. No.: WO2019/189571
PCT Pub. Date: Oct. 3, 2019

(65) Prior Publication Data
US 2021/0117262 A1    Apr. 22, 2021

(30) Foreign Application Priority Data
Mar. 29, 2018    (JP) .............................. JP2018-064531

(51) Int. Cl.
*G06F 11/00* (2006.01)
*G06F 11/07* (2006.01)
(52) U.S. Cl.
CPC ...... *G06F 11/0769* (2013.01); *G06F 11/0721* (2013.01)

(58) Field of Classification Search
CPC ............. G06F 11/0769; G06F 11/0721; G06F 11/0775; G06F 11/0787; G06F 11/0778;
(Continued)

(56) References Cited

U.S. PATENT DOCUMENTS

| 2006/0184498 A1* | 8/2006 | Meyer ................. G06F 11/3476 |
| 2014/0156595 A1* | 6/2014 | Rose ....................... G06F 16/27 707/625 |

(Continued)

FOREIGN PATENT DOCUMENTS

| JP | 2000-148525 A | 5/2000 |
| JP | 2003-015901 A | 1/2003 |

(Continued)

OTHER PUBLICATIONS

International Search Report for PCT Application No. PCT/JP2019/013594, dated Jul. 2, 2019.

*Primary Examiner* — Katherine Lin
(74) *Attorney, Agent, or Firm* — Sughrue Mion, PLLC

(57) ABSTRACT

A computer system that includes an active system service processor, a standby system service processor having a memory, and a unit, in which the active system service processor includes a first control unit configured to acquire log information indicating a log of the unit to cause the memory to store the information, and to output a read instruction for reading the log information to the standby system service processor according to an operation of instructing to read the log information, and the standby system service processor includes a second control unit configured to read the log information from the memory according to the read instruction, and to execute processing related to the read log information.

7 Claims, 5 Drawing Sheets

(58) Field of Classification Search
CPC ... G06F 11/07; G06F 11/0703; G06F 11/2097
See application file for complete search history.

(56) References Cited

U.S. PATENT DOCUMENTS

2015/0127931 A1* 5/2015 Kawarabayashi .... G06F 9/4405
　　　　　　　　　　　　　　　　　　　　　713/2
2017/0214742 A1 　7/2017 Zhu

FOREIGN PATENT DOCUMENTS

| JP | 2017-058751 A | 3/2017 |
| JP | 2017-167675 A | 9/2017 |

* cited by examiner sor having a memory, and a unit, in which the control
COMPUTER SYSTEM, COMMUNICATIONS SYSTEM, CONTROL METHOD BY COMPUTER SYSTEM, AND PROGRAM This application is a National Stage Entry of PCT/JP2019/013594 filed on Mar. 28, 2019, which claims priority from Japanese Patent Application 2018-064531 filed on Mar. 29, 2018, the contents of all of which are incorporated herein by reference, in their entirety.

TECHNICAL FIELD

The present invention relates to a computer system, a communications system, a control method by the computer system, and a program.

BACKGROUND ART

There is a computer system that includes a service processor having multiple configurations therein and reduces a load of an active system service processor.

In Patent Document 1, as a related technology, it is disclosed that, if a processing request is issued by a computer system (CPU), the request is executed by referring to a table and the processing result is reported to the CPU when a processing device is an active system. In addition, when the processing device is a standby system, a technology in which a load of an active system service processor is reduced by requesting processing of a request to a standby system service processor and the standby system service processor executing the processing requested from the active system service processor, is disclosed.

CITATION LIST

Patent Literature

[Patent Document 1]
Japanese Unexamined Patent Application, First Publication No. 2000-148525

SUMMARY OF THE INVENTION

Problems to be Solved by the Invention

Incidentally, in the case of a computer system including a redundant service processor using the technology disclosed in Patent Document 1, if a processing request is made by the computer system (CPU), the active system service processor performs processing of searching the table. For this reason, the load of the active system service processor may increase, other processing may take time, and other processing may not be able to be performed in some cases.

Each aspect of the present invention has an example object of providing a computer system, a communications system, a control method by the computer system, and a program which can solve the problems described above.

Means for Solving the Problems

In order to achieve the object described above, according to one aspect of the present invention, a computer system includes an active system service processor, a standby system service processor having a memory, and a unit. The active system service processor includes a first control unit configured to acquire log information indicating a log of the unit, cause the memory to store the log information, and output a read instruction for reading the log information to the standby system service processor according to an operation of instructing to read the log information. The standby system service processor includes a second control unit configured to read the log information from the memory according to the read instruction, and execute processing related to the read log information.

According to another aspect of the present invention, a communications system includes the computer system described above, and an operation terminal configured to output storage destination information indicating a storage destination in the operation terminal of log information indicating a log of a unit included in the computer system to the computer system.

According to another aspect of the present invention, a control method by a computer system that includes an active system service processor, a standby system service processor having a memory, and a unit, in which the control method includes acquiring, by the active system service processor, log information indicating a log of the unit, causing the memory to store the information, and outputting a read instruction for reading the log information to the standby system service processor according to an operation of instructing to read the log information, and reading, by the standby system service processor, the log information from the memory according to the read instruction and executing processing related to the read log information.

According to another aspect of the present invention, a program causes a computer of a computer system including an active system service processor, a standby system service processor, and a unit to execute processes. The processes includes acquiring log information indicating a log of the unit, causing the memory to store the log information, outputting a read instruction for reading the log information to the standby system service processor according to an operation of instructing to read the log information, reading the log information from the memory according to the read instruction, and executing processing related to the read log information.

Advantageous Effects of Invention

According to each aspect of the present invention, it is possible to shorten time required for requested processing in a computer system equipped with a service processor having multiple configurations.

EXAMPLE EMBODIMENT

First Embodiment

Hereinafter, an embodiment will be described in detail with reference to the drawings.

Figure 1:
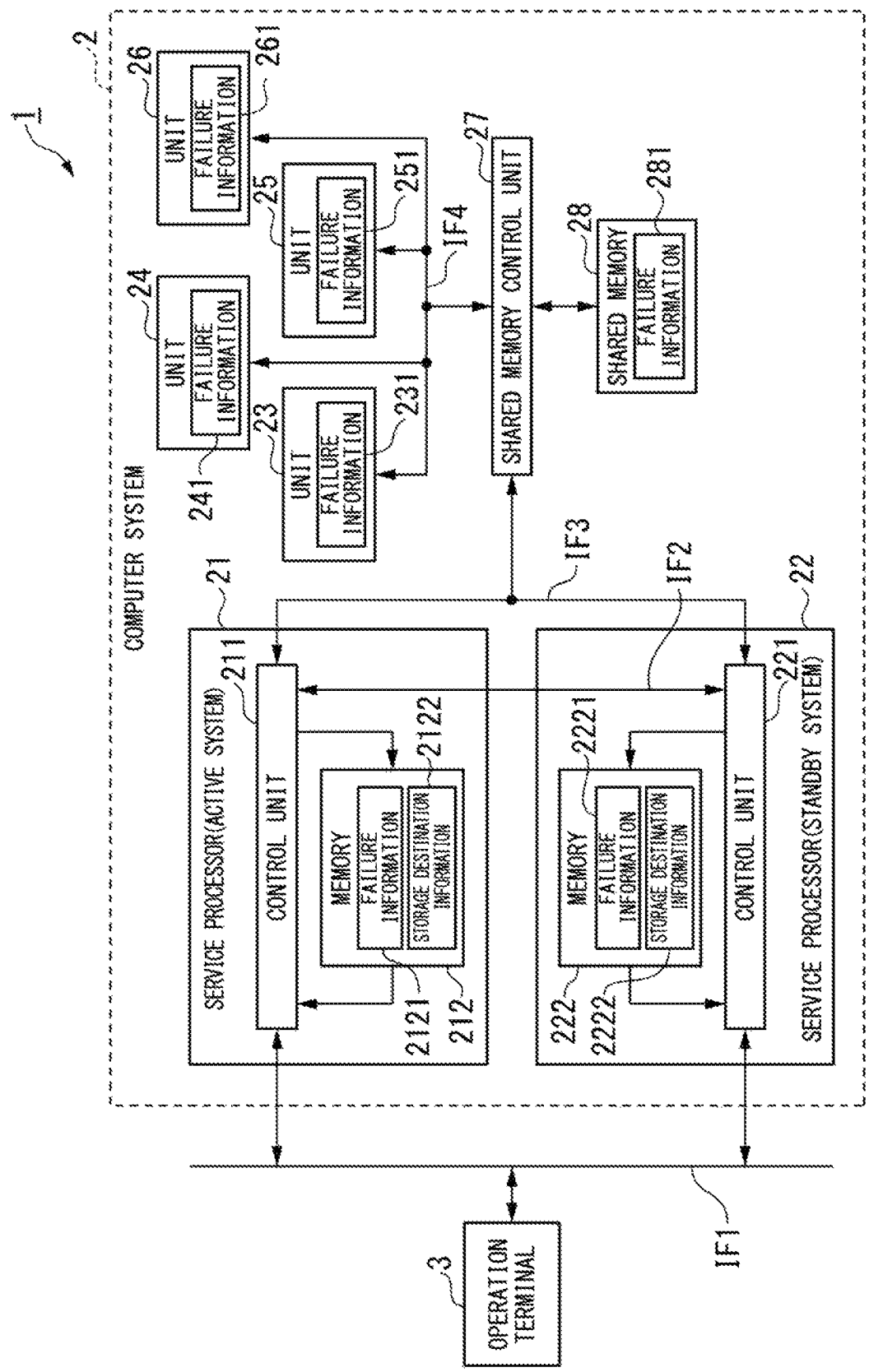
FIG. 1 is a diagram which shows a configuration of a communications system according to a first embodiment of the present invention.

FIG. 1 is a diagram which shows a configuration of a communications system according to a first embodiment. The communications system 1 according to the first embodiment of the present invention includes a computer system 2 and an operation terminal 3. The communications system 1 temporarily stores failure information (an example of a log) when a failure occurs in the computer system 2 in a shared memory 28 of the computer system 2, and then saves the information in an active system service processor of the computer system 2 as failure information. As a result, the communications system 1 is a system in which a load of the active system service processor is not increased even when a processing request is performed. As shown in FIG. 1, the computer system 2 includes a service processor 21 (an example of the active system service processor), a service processor 22 (an example of a standby system service processor), units 23, 24, 25, and 26, a shared memory control unit 27, and the shared memory 28.

The operation terminal 3 is a device that requests the computer system 2 to acquire failure information. The operation terminal 3 is connected to each of the service processors 21 and 22 via a communication interface IF1. The service processor 21 is connected to the service processor 22 via an interface IF2 between the service processors. The shared memory control unit 27 is connected to each of the service processors 21 and 22 via a diagnostic interface IF3. The shared memory control unit 27 is connected to each of the units 23, 24, 25, and 26 via a diagnostic interface IF4. The shared memory control unit 27 is connected to the shared memory 28.

The service processor 21 is an active system service processor. The service processor 21 performs an operation and control of the computer system 2.

The service processor 21 includes a control unit 211 (an example of a first control unit) and a memory 212.

The control unit 211 controls communication with each of the service processor 22, the units 23, 24, 25, and 26, and the operation terminal 3. In addition, the control unit 211 controls writing and reading of information in and from the memory 212.

The memory 212 stores failure information 2121 indicating logs of failures that have occurred in all units, and storage destination information 2122 indicating a storage destination in an operation terminal 3 of the failure information 2121. The failure information 2121 includes, for example, information on a date and time at which the failure has occurred, a place (a processor number, or the like) in which the failure has been detected, and a type of a failure (a cache failure in a processor, an interface failure between processors, and the like). The storage destination information 2122 includes a drive name and a directory name.

The service processor 22 is a standby system service processor. The service processor 22 continues the operation and control of the computer system 2 instead of the service processor 21 when a defect such as a failure or malfunction occurs in the service processor 21.

The service processor 22 includes a control unit 221 (an example of a second control unit) and a memory 222.

The control unit 221 controls communication with each of the service processor 21, the units 23, 24, 25, and 26, and the operation terminal 3. In addition, the control unit 221 controls writing and reading of information in and from the memory 222.

The memory 222 stores failure information 2221 indicating the logs of failures that have occurred in all units and storage destination information 2222 of the failure information 2221 of the operation terminal 3. The failure information 2221 and the storage destination information 2222 are the same as the failure information 2121 and the storage destination information 2122.

Each of the units 23, 24, 25, and 26 is a processor, a chipset, or a controller in the computer system 2. The units 23, 24, 25, and 26 hold failure information when a failure occurs in any of the units. Specifically, the unit 23 holds failure information 231 of the unit 23. The unit 24 holds failure information 241 of the unit 24. The unit 25 holds failure information 251 of the unit 25. The unit 26 holds failure information 261 of the unit 26.

The shared memory control unit 27 controls writing and reading of information in and from the shared memory 28.

When a failure has occurred in any of the units 23, 24, 25, and 26, the shared memory 28 stores failure information 281 that includes occurrence information of the failure.

Next, processing of the communications system 1 according to the first embodiment of the present invention will be described. Here, a processing flow of the communications system 1 shown in FIG. 2 will be described.

Figure 2:
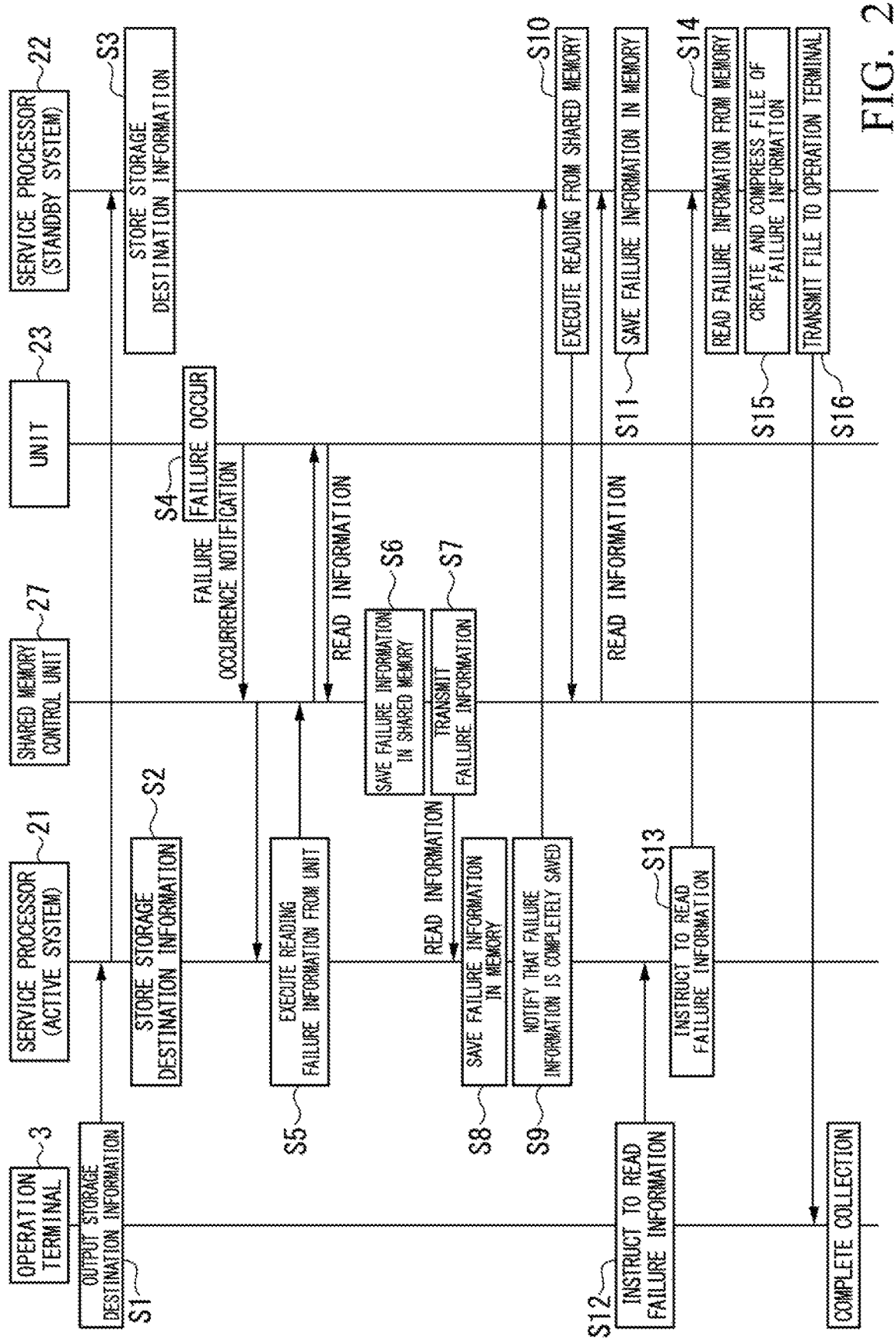
FIG. 2 is a diagram which shows a processing flow of the communications system according to the first embodiment of the present invention.

FIG. 2 is a diagram which shows the processing flow of the communications system according to the first embodiment. First, steps S1 to S3 that are processing for initial setting will be described.

The control unit 221 outputs failure information to the operation terminal 3 as a compressed file via the communication interface IF1.

The operation terminal 3 receives failure information from the service processor 22. The operation terminal 3 saves the received failure information. For this reason, the operation terminal 3 outputs storage destination information indicating a storage destination of the failure information to the service processor 21 via the communication interface IF1 (step S1). That is, the operation terminal 3 outputs the storage destination information of the failure information to the service processor 21 in advance in preparation for the reception of the failure information.

The control unit 211 receives the storage destination information from the operation terminal 3. The control unit 211 writes the received storage destination information in the memory 212. The memory 212 stores (saves) the storage destination information as the storage destination information 2122 (step S2). The control unit 221 outputs the storage destination information to the service processor 22 via the interface IF2 between the service processors.

The control unit 221 receives the storage destination information from the control unit 211. The control unit 221 writes the received storage destination information in the memory 222. The memory 222 stores the storage destination information as the storage destination information 2222 (step S3).

Next, steps S4 to S11 that are processing of acquiring failure information when a failure occurs will be described.

Note that, here, processing when a failure occurs will be described by taking a case in which a failure has occurred in the unit 23 as an example.

The unit 23 in which a failure has occurred outputs (notifies of) a failure occurrence notification indicating that a failure has occurred to the service processor 21 via the diagnostic interface IF4, the shared memory control unit 27, and the diagnostic interface IF3 (step S4).

The control unit 211 receives the failure occurrence notification from the unit 23. The control unit 211 instructs the shared memory control unit 27 to read the failure information 231 of the unit 23 if the failure occurrence notification is received (step S5).

The shared memory control unit 27 receives an instruction to read the failure information 231 from the control unit 211. The shared memory control unit 27 reads the failure information 231 from the unit 23 if the instruction is received. The shared memory control unit 27 writes (saves) the read failure information 231 in the shared memory 28 (step S6). Thereafter, the shared memory control unit 27 outputs (transmits) the failure information 231 to the service processor 21 (step S7).

The control unit 211 receives the failure information 231 from the shared memory control unit 27. The control unit 211 writes the received failure information 231 in the memory 212 as the failure information 2121.

The memory 212 stores the failure information 231 as the failure information 2121 (step S8).

The control unit 211 outputs (notifies of) information indicating that saving of the failure information 2121 has been completed to the service processor 22 if the failure information 2121 is written in the memory 212 (step S9).

The control unit 221 of the service processor 22 receives the information indicating that the saving of the failure information 2121 has been completed from the service processor 21. The control unit 221 instructs the shared memory control unit 27 to read the failure information 231 of the unit 23 if the information indicating that the saving of the failure information 2121 has been completed is received.

The shared memory control unit 27 receives an instruction to read the failure information 231 from the service processor 22. The shared memory control unit 27 reads the failure information 231 from the unit 23 if the instruction is received. The shared memory control unit 27 outputs (transmits) the read failure information 231 to the service processor 22.

The control unit 221 receives the failure information 231 from the shared memory control unit 27 (step S10). The control unit 221 writes the received failure information 231 in the memory 222 as the failure information 2221.

The memory 222 stores the failure information 231 as the failure information 2221 (step S11).

Next, steps S12 to S16 that are processing for reading failure information when a failure occurs will be described.

An operator performs an operation for acquiring failure information generated in the computer system 2 on the operation terminal 3. The operation terminal 3 outputs information for instructing to read the failure information to the computer system 2 according to an operation of the operator (step S12).

The control unit 211 receives information for instructing to read failure information from the operation terminal 3. The control unit 211 outputs (transmits) only the information indicating a read instruction of failure information to the service processor 22 without performing compression processing and transmission processing of the failure information if the information for instructing to read the failure information is received (step S13).

The control unit 221 of the service processor 22 receives the information indicating a read instruction of the failure information from the service processor 21. The control unit 221 reads the failure information 2221 from the memory 222 if the information indicating an instruction to read the failure information is received (step S14).

The control unit 221 creates a text file on the basis of the read failure information 2221. The control unit 221 performs file compression of the created text file (step S15).

The control unit 221 outputs (transmits) the created compression file (an example of a processing result) to the storage destination of the operation terminal 3 indicated by the storage destination information 2222 according to the storage destination information 2222 set in the initial settings (S1 to S3) (step S16).

The operation terminal 3 receives the compression file from the service processor 22. The operation terminal 3 writes (saves) the received compression file in the storage destination.

The communications system 1 according to the first embodiment of the present invention has been described above. In the computer system 2 of the communications system 1 according to the first embodiment of the present invention, the control unit 211 acquires the failure information of the unit 23 and causes the memory 222 of the service processor 22 to store it. In addition, the control unit 211 outputs a read instruction for reading the failure information to the service processor 22 when there is an operation of instructing to read the failure information. The control unit 221 reads the failure information from the memory 222 according to the read instruction of the failure information, and executes file compression processing related to the read failure information.

With this configuration, the service processor 22 can perform processing of acquiring the failure information and the service processor 21 can perform the requested processing. For this reason, the computer system 2 including a service processor having multiple configurations can shorten time required for the requested processing. That is, in the present embodiment, the standby system service processor 22 acquires the failure information and performs predetermined processing instead of the active system service processor 21. As a result, it is possible to minimize the influence of the acquisition of the failure information on the operation and control of the computer system 2.

In addition, the computer system 2 of the communications system 1 according to the first embodiment of the present invention includes the shared memory 28 that stores failure information and a shared memory control unit 27 that controls the writing and reading of the information in and from the shared memory 28. In the computer system 2, the control unit 211 acquires failure information from the shared memory 28 via the shared memory control unit 27 and causes the memory 222 of the service processor 22 to store it.

In this manner, since the shared memory control unit 27 shares a part of the processing of acquiring the failure information, processing of the control unit 211 is further reduced. For this reason, the computer system 2 including the service processor having multiple configurations can further shorten time required for the requested processing.

Second Embodiment

Figure 3:
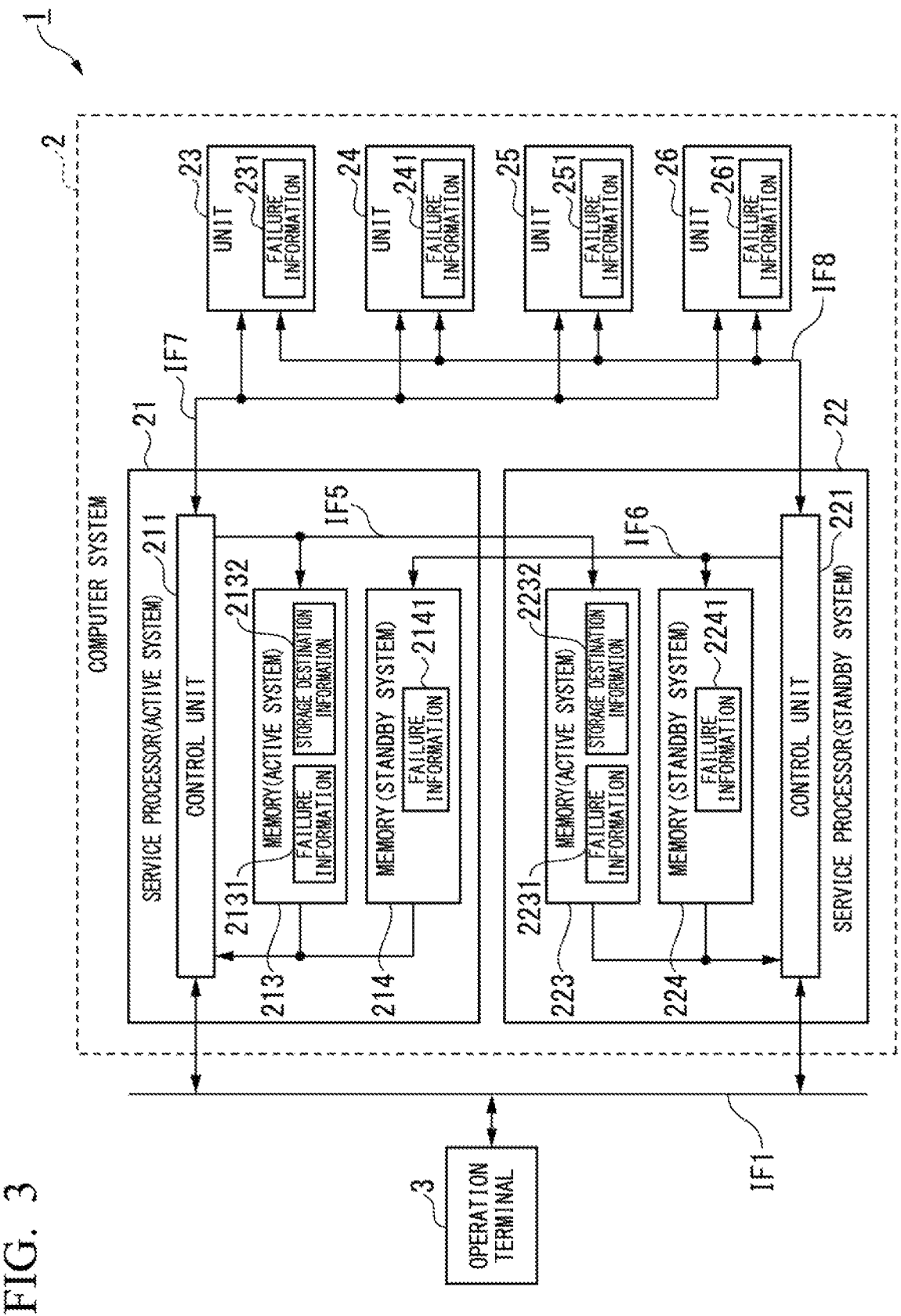
FIG. 3 is a diagram which shows a configuration of a communications system according to a second embodiment of the present invention.

FIG. 3 is a diagram which shows a configuration of a communications system according to a second embodiment. The communications system 1 according to the second embodiment of the present invention includes a computer system 2 and an operation terminal 3. Similar to the communications system 1 according to the first embodiment of the present invention, the communications system 1 according to the second embodiment of the present invention temporarily stores failure information (an example of a log) when a failure occurs in the computer system 2 in the shared memory of the computer system 2, and then saves the information in the active system service processor of the computer system 2 as failure information. As a result, the system is a system in which the load of the active system service processor is not increased even when a processing request is made. The computer system 2 includes, as shown in FIG. 3, service processors 21 and 22, and units 23, 24, 25, and 26.

The operation terminal 3 is connected to each of the service processors 21 and 22 via a communication interface IF1. The service processor 21 is connected to the service processor 22 via interfaces IF5 and IF6 between the service processors. The service processor 21 is connected to each of the units 23, 24, 25, and 26 via a diagnostic interface IF7. The service processor 22 is connected to each of the units 23, 24, 25, and 26 via a diagnostic interface IF8.

The service processor 21 includes a control unit 211, a memory (an active system) 213, and a memory (a standby system) 214.

The service processor 22 includes a control unit 221, a memory (an active system) 223, and a memory (a standby system) 224.

The control unit 211 controls communication with each of the service processor 22, the units 23, 24, 25, and 26, and the operation terminal 3. The control unit 211 controls writing of information in the memories (the active systems) 213 and 223 via the interface IF5 between the service processors. The control unit 211 controls reading of information from the memory (the active system) 213 and the memory (the standby system) 214.

The memory (the active system) 213 stores failure information 2131 acquired by the service processor 21 and storage destination information 2132 acquired by the service processor 21.

The memory (the standby system) 214 stores failure information 2141 acquired by the service processor 22.

The service processor 22 includes the control unit 221, the memory (the active system) 223, and the memory (the standby system) 224.

The control unit 221 controls communications with each of the service processor 21, the units 23, 24, 25, and 26, and the operation terminal 3. The control unit 221 controls writing of information in the memories (the standby systems) 214 and 224 via the interface IF6 between the service processors. The control unit 221 controls reading of information from the memory (the active system) 223 and the memory (the standby system) 224.

The memory 223 stores failure information 2231 acquired by the service processor 21 and storage destination information 2232 acquired by the processor 21.

The memory 224 stores failure information 2241 acquired by the service processor 22.

Each of the units 23, 24, 25, and 26 hold failure information when a failure occurs, for each unit.

Figure 4:
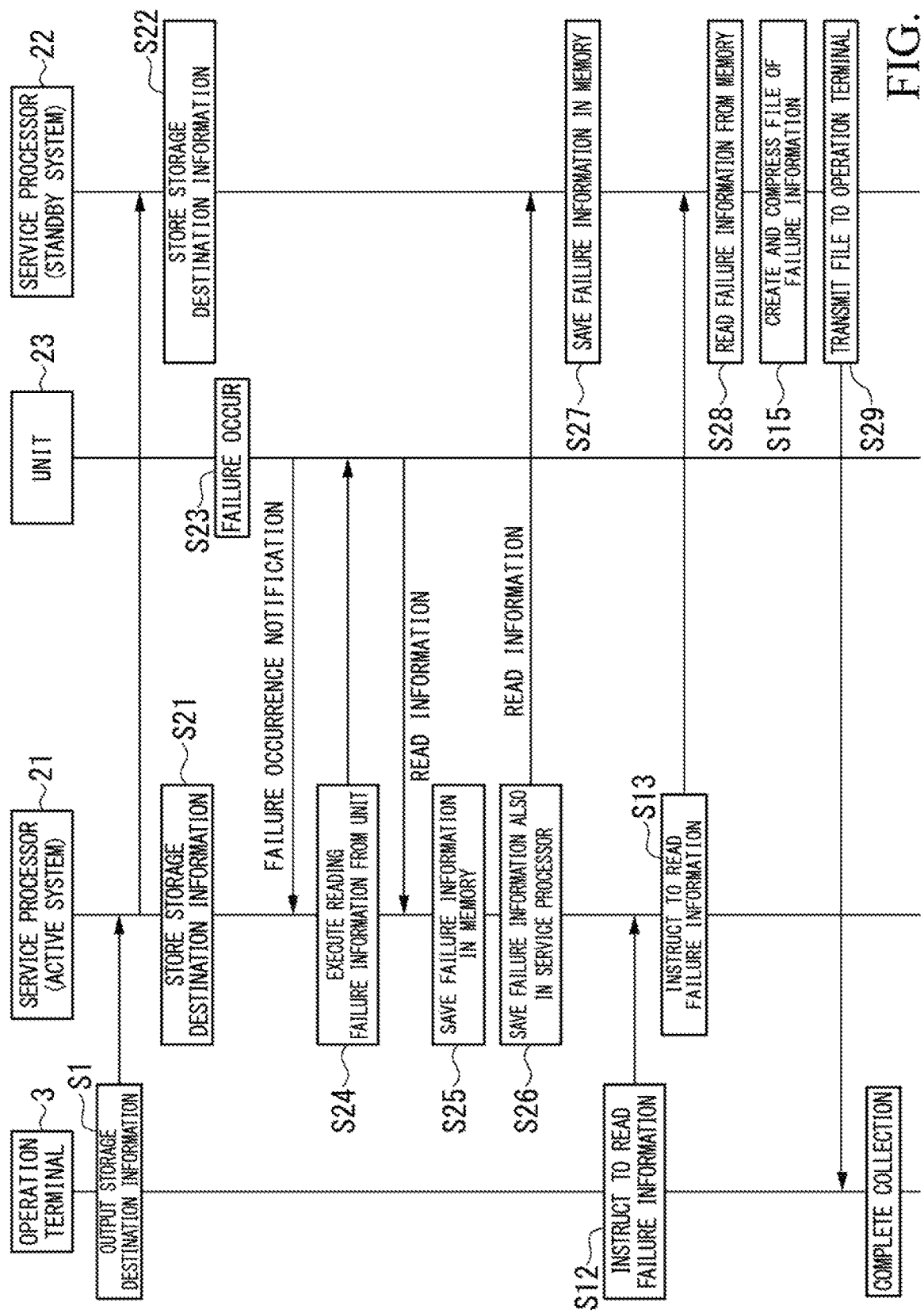
FIG. 4 is a diagram which shows a processing flow of the communications system according to the second embodiment of the present invention.

Next, processing of the communications system 1 according to the second embodiment of the present invention will be described. Here, a processing flow of the communications system 1 in the second embodiment shown in FIG. 4 will be described.

First, steps S1 to S22 that are processing for initial setting will be described.

The control unit 221 of the service processor 22 outputs failure information to the operation terminal 3 as a compressed file via the communication interface IF1.

The operation terminal 3 receives failure information from the service processor 22. The operation terminal 3 saves the received failure information. The operation terminal 3 performs processing of step S1. That is, the operation terminal 3 outputs the storage destination information of the failure information to the service processor 21 in advance in preparation for the reception of the failure information.

The control unit 211 of the service processor 21 receives the storage destination information from the operation terminal 3. The control unit 211 writes the received storage destination information in the memories (the active systems) 213 and 223 via the interface IF5 between the service processors.

The memory (the active system) 213 of the service processor 21 stores (saves) the storage destination information as the storage destination information 2132 (step S21).

The memory (active system) 223 of the service processor 22 stores (saves) the storage destination information as the storage destination information 2232 (step S22).

Next, steps S23 to S27 that are processing for acquiring failure information when a failure occurs will be described.

Note that, here, processing when a failure occurs will be described by taking a case in which a failure has occurred in the unit 23 as an example.

The unit 23 in which a failure has occurred outputs (notifies of) a failure occurrence notification indicating that a failure has occurred to the service processor 21 via the diagnostic interface IF7 (step S23).

The control unit 211 receives the failure occurrence notification from the unit 23. The control unit 211 reads the failure information 231 from the unit 23 if the failure occurrence notification is received. The control unit 211 writes (saves) the read failure information 231 in the memory (active system) 213 of the service processor 21 (step S24).

The memory (active system) 213 stores the failure information 231 as the failure information 2131 (step S25).

The control unit 211 writes (saves) the read failure information 231 in the memory (active system) 223 of the service processor 22 (step S26).

The memory (active system) 223 stores the failure information 231 as the failure information 2231 (step S27).

Next, steps S12 to S29 that are processing of reading failure information when a failure occurs will be described.

The operator performs an operation for acquiring failure information generated in the computer system 2 on the operation terminal 3. The operation terminal 3 performs the processing of step S12.

The control unit 211 receives information for instructing to read the failure information from the operation terminal 3. The control unit 211 performs the processing of step S13 without performing the compression processing and transmission processing of the failure information if the information instructing to read the failure information is received. That is, the control unit 211 outputs only the information indicating a read instruction of the failure information to the service processor 22.

The control unit 221 receives information indicating an instruction to read failure information from the service processor 21. The control unit 221 reads the failure information 2231 from the memory (the active system) 223 and reads the failure information 2241 from the memory (the standby system) 224 if the information indicating an instruction to read failure information is received (step S28).

The control unit 221 creates a text file on the basis of the read failure information 2231 and failure information 2241.

The control unit 221 performs the processing of step S15. That is, the control unit 221 performs file compression of the created text file.

The control unit 221 outputs (transmits) the created compression file to the storage destination of the operation terminal 3 indicated by the storage destination information 2232 according to the storage destination information 2232 set in initial settings (step S29).

The operation terminal 3 receives the compression file from the service processor 22. The operation terminal 3 writes (saves) the received compression file in the storage destination.

The communications system 1 according to the second embodiment of the present invention has been described above. In the computer system 2 of the communications system 1 according to the second embodiment of the present invention, when a failure has occurred in any one of the units 23, 24, 25, and 26, each of the control unit 211 and the control unit 221 reads the failure information 231 directly from a corresponding unit in which the failure has occurred.

In this manner, the computer system 2 according to the second embodiment of the present invention can be configured to be smaller than the computer system 2 according to the first embodiment.

In addition, in the present embodiment, the active system service processor 21 writes failure information in the memory 223 held by the standby system service processor 22. As a result, the standby system service processor 22 can acquire failure information from the memory thereof. Therefore, it is possible to acquire failure information more efficiently.

Figure 5:
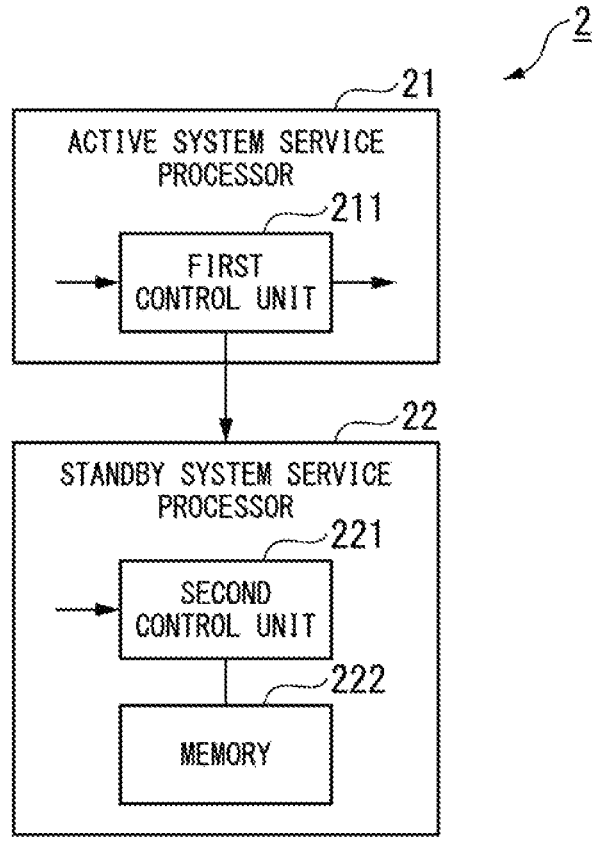
FIG. 5 is a diagram which shows a minimum configuration of a computer system according to the embodiments of the present invention.

FIG. 5 is a diagram which shows a minimum configuration of the computer system 2 according to the embodiments of the present invention.

The computer system 2 is a computer system that includes an active system service processor 21, a standby system service processor 22 having a memory 222, and a unit 23 (not shown in FIG. 5).

The active system service processor 21 includes a first control unit 211 as shown in FIG. 5.

The first control unit 211 acquires log information that indicates a log of the unit 23 and causes the memory 222 to store the information. The first control unit 211 outputs a read instruction for reading the log information to the standby system service processor 22 when there is an operation of instructing to read the log information.

The standby system service processor 22 includes a second control unit 221 as shown in FIG. 5.

The second control unit 221 reads the log information from the memory 222 according to the read instruction output by the first control unit 211. The second control unit 221 executes processing related to the read log information.

Note that the processing in the embodiments of the present invention may have an order changed as long as appropriate processing is performed. For example, processing of step S26 and step S27 is performed after processing of step S24 and step S25 is performed in the processing of the communications system 1 shown in FIG. 4. That is, it is assumed that processing of writing the failure information 231 in the memory 223 is performed after processing of writing the failure information 231 in the memory 213 is performed. However, the processing of step S24 and step S25 may be performed after the processing of step S26 and step S27 is performed in the processing of the communications system 1 in another embodiment of the present invention.

Each of the shared memory 28, the memories 212, 213, 214, 222, 223, and 224, and the other storage device according to the embodiment of the present invention may be provided anywhere as long as appropriate information is transmitted and received. In addition, each of the shared memory 28, the memories 212, 213, 214, 222, 223, and 224, and the other storage device may exist in a plurality and may store data in a distributed manner, as long as appropriate information is transmitted and received.

Although the embodiments of the present invention have been described, the operation terminal 3 described above and other control devices may have a computer system therein. Then, a procedure of the processing described above is stored in a computer readable recording medium in a form of a program, and the processing described above is performed by a computer reading and executing this program. A specific example of the computer is shown as follows.

Figure 6:
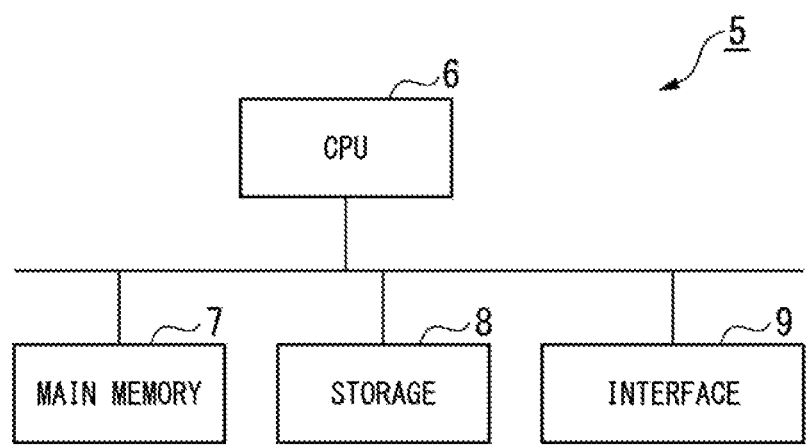
FIG. 6 is a schematic block diagram which shows a configuration of a computer according to at least one embodiment.

FIG. 6 is a schematic block diagram which shows a configuration of a computer according to at least one embodiment.

A computer 5 includes a CPU 6, a main memory 7, a storage 8, and an interface 9 as shown in FIG. 6.

For example, each of the operation terminal 3 described above and other control devices is mounted on the computer 5. Then, an operation of each processing unit described above is stored in the storage 8 in the form of a program. The CPU 6 reads the program from the storage 8 to expand it in the main memory 7, and executes the processing described above according to the program. In addition, the CPU 6 reserves a storage area corresponding to each storage described above in the main memory 7 according to the program.

In addition, the computer system 2 may include the computer system described above, that is, the computer 5 shown in FIG. 6.

Examples of the storage 8 include a hard disk drive (HDD), a solid state drive (SSD), a magnetic disc, a magneto-optical disc, a compact disc read only memory (CD-ROM), a digital versatile disc read only memory (DVD-ROM), a semiconductor memory, and the like. The storage 8 may be an internal medium directly connected to a bus of the computer 5, or may be an external medium connected to the computer 5 via the interface 9 or a communication line. In addition, when this program is distributed to the computer 5 through the communication line, the computer 5 that has received the distribution may expand the program in the main memory 7, and execute the processing described above. In at least one embodiment, the storage 8 is a non-transitory tangible storage medium.

Moreover, the program described above may realize some of the functions described above. Furthermore, the program described above may be a file that can realize the functions described above in combination with the program already recorded in the computer system, that is, a so-called difference file (a difference program).

Although some embodiments of the present invention have been described, these embodiments are examples and do not limit a scope of the invention. Various additions, omissions, replacements, and changes may be made in these embodiments within a range not departing from a gist of the invention.

Priority is claimed on Japanese Patent Application No. 2018-064531, filed Mar. 29, 2018, the content of which is incorporated herein by reference

INDUSTRIAL APPLICABILITY

According to each aspect of the present invention, it is possible to shorten time required for requested processing in a computer system equipped with a service processor having multiple configurations.

REFERENCE SIGNS LIST

1 Communications system
2 Computer system
3 Operation terminal
5 Computer
6 CPU
7 Main memory
8 Storage
9 Interface
21 Service processor, Active system service processor
22 Service processor, Standby system service processor
23, 24, 25, 26 Unit
27 Shared memory control unit
28 Shared memory
211 Control unit, First control unit
221 Control unit, Second control unit
212, 213, 214, 222, 223, 224 Memory
231, 241, 251, 261, 281, 2121, 2131, 2141, 2221, 2231, 2241 Failure information
2122, 2132, 2222, 2232 Storage destination information
IF1 Communication interface
IF2, IF5, IF6 Interface between service processors
IF3, IF4, IF7, IF8 Diagnostic interface

What is claimed is:

1. A computer system comprising:
an active system service processor,
a standby system service processor having a memory, and
a unit,
wherein the active system service processor includes
a first controller configured to acquire log information indicating a log of the unit, cause the memory to store the log information, and output a read instruction for reading the log information to the standby system service processor according to an operation of instructing to read the log information, and
the standby system service processor includes
a second controller configured to read the log information from the memory according to the read instruction, and execute processing related to the read log information.

2. The computer system according to claim 1, further comprising:
a shared memory configured to store the log information; and
a shared memory controller configured to control writing and reading of information in and from the shared memory,
wherein the first controller is configured to cause the standby system service processor to acquire the log information from the shared memory via the shared memory controller, and cause the memory to store the log information.

3. The computer system according to claim 1,
wherein the memory is configured to store storage destination information indicating a storage destination of the log information in an operation terminal.

4. The computer system according to claim 3,
wherein the second controller is configured to output a processing result obtained by executing the processing related to the log information to the storage destination indicated by the storage destination information.

5. The computer system according to claim 1,
wherein the log information is failure information indicating a log of a failure that has occurred in the unit.

6. A control method by a computer system that includes an active system service processor, a standby system service processor having a memory, and a unit, the control method comprising:
acquiring, by the active system service processor, log information indicating a log of the unit, causing the memory to store the log information, and outputting a read instruction for reading the log information to the standby system service processor according to an operation of instructing to read the log information, and
reading, by the standby system service processor, the log information from the memory according to the read instruction, and executing processing related to the read log information.

7. A non-transitory computer-readable recording medium storing a program which causes a computer of a computer system including an active system service processor, a standby system service processor having a memory, and a unit to execute processes, the processes comprising:
acquiring log information indicating a log of the unit, causing the memory to store the log information, and outputting a read instruction for reading the log information to the standby system service processor according to an operation of instructing to read the log information; and
reading the log information from the memory according to the read instruction, and executing processing related to the read log information.

* * * * *